United States Patent [19]

Weld

[11] Patent Number: 4,645,267

[45] Date of Patent: Feb. 24, 1987

[54] VEHICLE WHEEL HAVING NON-SUSPENSION WIRE SPOKES

[75] Inventor: Richard G. Weld, Kansas City, Mo.

[73] Assignee: Weld Racing Enterprises, Inc., Kansas City, Mo.

[21] Appl. No.: 655,255

[22] Filed: Sep. 28, 1984

[51] Int. Cl.[4] .......................... B60B 3/02; B60B 7/04; B60B 7/06

[52] U.S. Cl. ............................. 301/37 R; 301/37 SS; 301/63 R; 29/159.1

[58] Field of Search ................. 301/13 R, 36 R, 37 R, 301/37 SS, 63 R, 63 DD, 37 P; 29/159.1

[56] References Cited

U.S. PATENT DOCUMENTS

| | | |
|---|---|---|
| 1,380,906 | 6/1921 | Hoffman . |
| 2,551,783 | 5/1951 | Ash . |
| 2,719,757 | 10/1955 | Gaylord ............................ 301/37 P |
| 3,222,765 | 12/1965 | Parent et al. . |
| 3,262,191 | 7/1966 | Albertson et al. . |
| 3,612,614 | 10/1971 | Ware . |
| 3,726,566 | 4/1973 | Beith ............................. 301/63 R X |
| 3,993,357 | 11/1976 | Reppert . |
| 4,084,828 | 9/1977 | Lucas et al. . |
| 4,363,347 | 12/1982 | Bumgartner . |

FOREIGN PATENT DOCUMENTS

| | | | |
|---|---|---|---|
| 430993 | 2/1948 | Italy ................................. | 301/63 R |
| 576398 | 5/1958 | Italy ................................. | 301/63 R |

Primary Examiner—David A. Scherbel
Attorney, Agent, or Firm—Litman, Day & McMahon

[57] ABSTRACT

A vehicle wheel including a center section integrally formed with a rear rim half by a method including the steps of drawing, forming and stamping a first lightweight metal alloy bank. A front rim half is drawn, formed and stamped from a second blank and is attached to the front rim half. A drop comprising excess material from the second blank is used to form an additional part or parts of the wheel.

14 Claims, 14 Drawing Figures

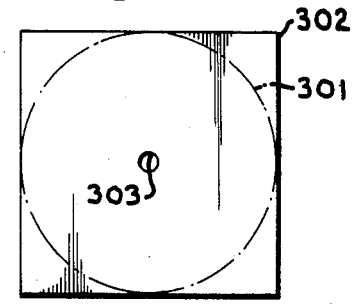
Fig. 8.
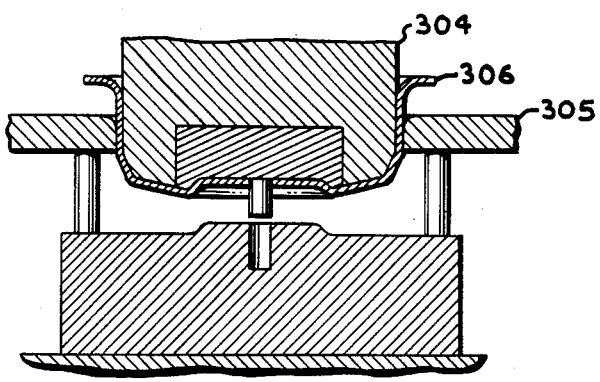
Fig. 9.
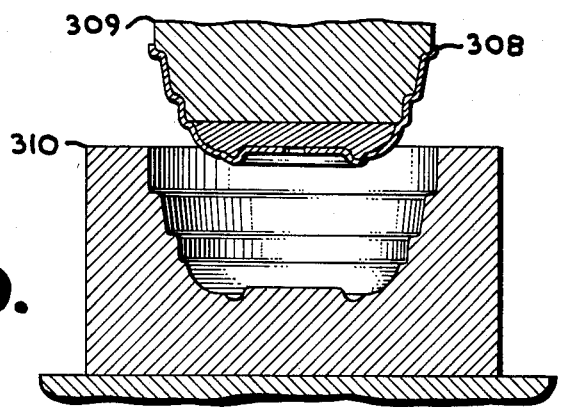
Fig. 10.
Fig. 11.
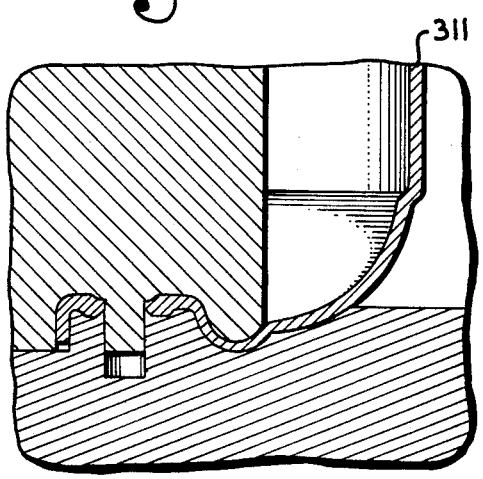
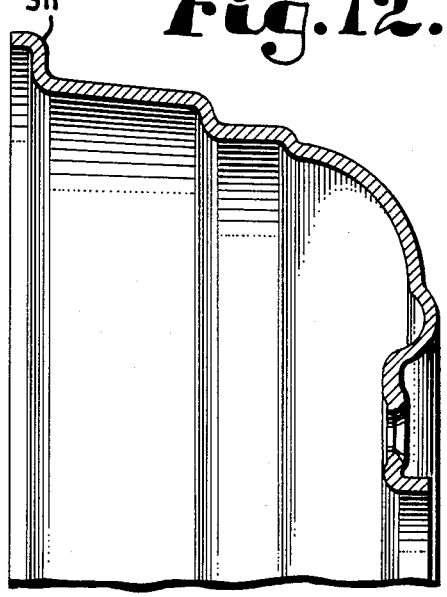
Fig. 12.

VEHICLE WHEEL HAVING NON-SUSPENSION WIRE SPOKES

BACKGROUND OF THE INVENTION

1. Field of the Invention

The present invention relates generally to vehicle wheels and in particular to a wheel which is drawn, formed and stamped from light metal alloy blanks and a method of manufacturing such a wheel wherein several parts thereof may be formed from a single blank.

2. Description of the Prior Art

Various types of vehicle wheels are well known in the prior art and generally include a center section (sometimes referred to as a spider, flange or web) and a rim section. For example, a common type of automobile wheel is shown in the Ash U.S. Pat. No. 2,551,783 wherein the rim section comprises a pair of separate rim halves each having a drop center and welded together along an annular weld seam at the rim drop center. The center section of the wheel shown in the Ash patent includes an outer, annular flange which is welded to the rim drop center. A disadvantage in constructing such a wheel is that the rim halves are formed from flat strips of metal which are welded together at their ends to form hoop-like bands and thus require additional manufacturing steps.

Alternatively, wheels may be produced from flat blanks by one or a combination of operations including die forming, die stamping, extruding, hot rolling, cold rolling, spinning and drawing. For example, the Parent et al. U.S. Pat. No. 3,222,765 discloses a method of producing a wheel from a flat blank by spinning and die forming operations. However, such methods often result in substantial amounts of waste material when the parts are cut to their final configurations.

Another method of forming wheels from flat blanks is shown in the Albertson et al. U.S. Pat. No. 3,262,191 wherein disk and rim sections having tapered thicknesses are produced in single, continuous power roll forming operations.

Vehicle wheels have also been constructed of various materials, the most common of which are steel and light alloy metals, such as aluminum and magnesium. In view of the current emphasis on minimizing vehicle weight for greater fuel economy, the light alloy wheel constructions are preferred. For example, 14 inch steel automobile wheels weigh approximately 17 pounds each whereas cast aluminum wheels of the same size weigh approximately 13 pounds each and drawn, formed and stamped aluminum wheels according to the present invention weigh approximately 9.5 pounds each.

In addition to their weight advantage with respect to steel wheels, aluminum wheels tend to dissipate brake heat faster and may be polished or brushed to provide an aesthetically pleasing finished appearance which is resistant to rust and corrosion. Steel wheels, on the other hand, must be painted, plated or otherwise protected to prevent rusting. Accordingly, nonplated steel wheels are often provided with hubcaps while aluminum wheels may be designed to exhibit a satisfactory finished appearance without wheel covers, hubcaps and the like.

Furthermore, heat-treated aluminum has a better strength-to-weight ratio than steel. Hence, aluminum wheels are used extensively in high performance applications where strength and weight are crucial, such as for competition racing.

Although cast aluminum wheels are well known and are generally lighter than steel wheels of comparable size, they suffer from several drawbacks. First of all, the molds for casting aluminum wheels tend to be relatively expensive as is the casting process itself. Secondly, substantial amounts of labor are generally required to machine and polish the wheels after casting. Thirdly, it is often difficult to achieve the necessary airtightness in a cast wheel without extensive grinding and polishing or coating with an air-impervious material, all of which add to the cost of such wheels. Finally, in the casting and cooling process the metal alloy may become brittle or fracture.

Thus, light alloy wheels formed in two or more interconnected sections in many respects offer the best available wheel construction for strength, lightness and ease of manufacture. However, heretofore there has not been available either a vehicle wheel or a method of forming a vehicle wheel which combines the advantages and features of the present invention.

SUMMARY OF THE INVENTION

In the practice of the present invention a vehicle wheel is provided which includes a center section having a hub opening and a plurality of lug bolt openings. A rear rim half is integrally formed with the center section and extends rearwardly therefrom. A front rim half is adapted to receive the center section in a close fitting engagement and is welded thereto. A method of forming the wheel is provided which includes the steps of drawing, forming and stamping the center section and rear rim half from a flat blank. The front rim half is formed from another flat blank and a drop comprising excess material is cut from a formed blank in making the front rim half. The drop is then further processed to form additional parts of the wheel. In two embodiments of the present invention the drop is used to form spoke fellies and hub sections for a non-suspension wire wheel. In three other embodiments of the present invention the drop is used to form a wheel cover or facia.

OBJECTS OF THE INVENTION

The principle objects of the present invention are to provide a vehicle wheel; to provide such a wheel which comprises a light metal alloy; to provide such a wheel which comprises an aluminum or magnesium alloy; to provide such a wheel which is drawn, formed and stamped from a flat sheet blank; to provide such a wheel wherein a drop from the blank is utilized to form other parts; to provide such a wheel wherein the drop is used to form a spoke felly and a hub section for a non-suspension wire spoke wheel; to provide such a wheel wherein the drop is used to form a facia plate; to provide such a wheel wherein material waste is minimized; to provide such a wheel wherein a center section and a rear rim half are integrally formed from a single blank; to provide such a wheel wherein a front rim half is formed from another blank; to provide such a wheel which is relatively lightweight; to provide such a wheel which is relatively strong; to provide such a wheel which is efficient in operation, economical to manufacture, capable of a long operating life and particularly well adapted for the proposed usage thereof; to provide a method of forming such a wheel wherein material blanks are drawn, formed and stamped; to provide such a method wherein a center section and a rear rim half are integrally formed from a single blank; to provide such a method wherein a front rim half is formed from another blank; to provide such a method wherein a drop is cut from the second rim half; to provide such a method wherein the drop is used for a spoke felly and a hub section for wire spoke wheels; to provide such a method wherein the drop is used for a wheel cover or facia; and to provide such a method to efficiently and economically produce wheels with a minimum amount of material waste.

Other objects and advantages of the invention will become apparent from the following detailed description taken in connection with the accompanying drawings wherein are set forth by way of illustration and example certain embodiments of the present invention.

BRIEF DESCRIPTION OF THE DRAWINGS

FIG. 8 shows a flat plate of aluminum alloy stock with a cut line for a circular blank.

FIG. 9 is a cross section of a blank for the present invention being drawn on a punch press.

FIG. 10 is a cross section of the blank being formed on a punch press.

FIG. 11 is a fragmentary cross section of the blank being stamped on a punch press.

FIG. 12 is a fragmentary cross section of a combination center section and rear rim half for the wheel embodying the present invention.

DETAILED DESCRIPTION OF PREFERRED EMBODIMENTS

Figure 13:
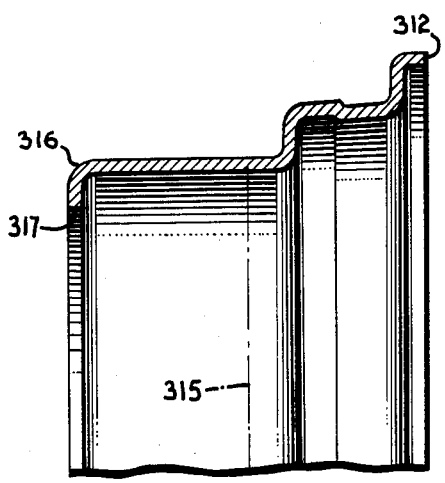
FIG. 13 is a fragmentary cross section of a blank for a front rim half showing cut lines for a drop.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The terms "rear" and "front" refer to the left and right respectively of the vehicle wheels embodying the present invention as oriented in FIGS. 1, 2, 3 and 5-7. The terms "inner" and "outer" and derivatives thereof refer to respective directions which are oriented radially with respect to the vehicle wheels embodying the present invention. The term "coaxial" means with respect to the rotational axes of the vehicle wheels embodying the present invention.

Referring to the drawings in more detail, the reference numeral 1 generally designates a wheel comprising a preferred embodiment of the present invention. The wheel 1 generally comprises a coaxial center section 2 and a coaxial rim section 6 with a coaxial rear rim half 3 and a coaxial front rim half 4. The center section 2 is integrally formed with the rear rim half 3 and includes a hub opening 5.

A plurality of lug bolt openings 11 are positioned radially outwardly from the hub opening 5 in a circular bolt pattern concentric with the hub opening 5. The lug bolt openings 11 extend through forwardly-convex lug embossments 10 stamped in the center section 2. Any desired number of lug bolt openings 11 may be provided, although most passenger vehicles include four, five or six lug bolts per wheel. The lug bolt openings 11 include chamferred outer edges 12 which aid in centering the wheel 1 when it is mounted on a vehicle.

Positioned radially outwardly from the lug bolt openings 11 is a coaxial outwardly-convex ridge 16. From the ridge 16 the center section 2 sweeps outwardly and rearwardly through a transition portion 17 to a coaxial, cylindrical, center section mating portion 21 with a substantially sharp, angular intersection 22 including a radially extending stop 23. The intersection 22 may be considered to demarcate the wheel center section 2 and the rear rim half 3, although they are continuous and integrally formed.

Extending rearwardly from the intersection 22 is a rear half 25 of a coaxial recessed area or drop center 26. Positioned radially outwardly and axially rearwardly from the recessed area rear half 25 is a coaxial rear rim bed 29. The rear rim half 3 terminates at a coaxial rear flange 31 which extends radially outwardly and axially rearwardly from the rear rim bed 29.

The front rim half 4 terminates at a substantially square rear edge 37. Extending forwardly therefrom is a combined front mating portion 36 and recessed area front half 38. The front mating portion 36 has an inside diameter substantially equal to the outside diameter of the rear mating portion 21. Thus, the rear mating portion 21 is telescopically received in the front mating portion 36 in a close-fitting engagement. The square rear edge 37 of the front rim half 4 abuts the stop 23 whereat the rim halves 3, 4 are welded at a weld joint 39. The angular intersection 22 between the center section 2 and the rear rim half 3 facilitates proper placement of the front rim half 4 by providing a positive stop 23 for the front rim half rear edge 37 to register against. A V-shaped groove 40 is formed between the rear rim half 3 and the front rim half rear edge 37 for receiving the weld joint 39 to facilitate the establishment of an airtight seal between the rim halves 3, 4 as required for use with tubeless tires.

A coaxial front rim bed 43 extends forwardly from the recessed area front half 38 and is positioned radially outwardly therefrom. The front rim half 4 terminates at a coaxial, annular front flange 45 extending forwardly and radially outwardly from the front rim bed 43.

Figure 1:
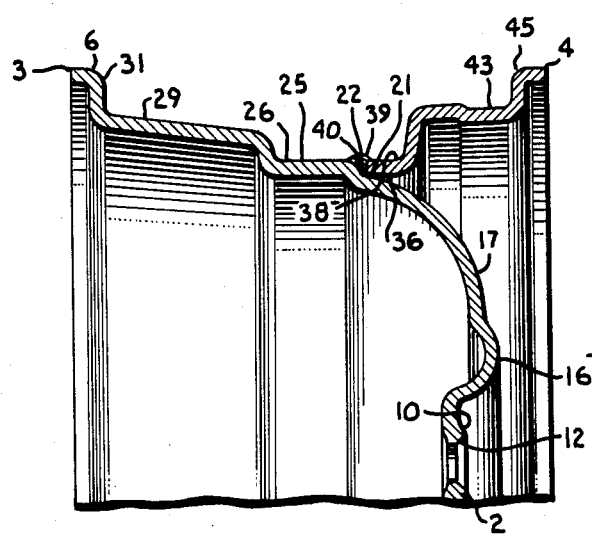
FIG. 1 is a fragmentary cross section of a basic wheel embodying the present invention which is incorporated in all of the disclosed embodiments.

The elements of the wheel 1 described thus far and as shown in FIG. 1 are mostly common to all of the disclosed embodiments of the present invention which vary in appearance depending upon the desired aesthetics.

Figure 2:
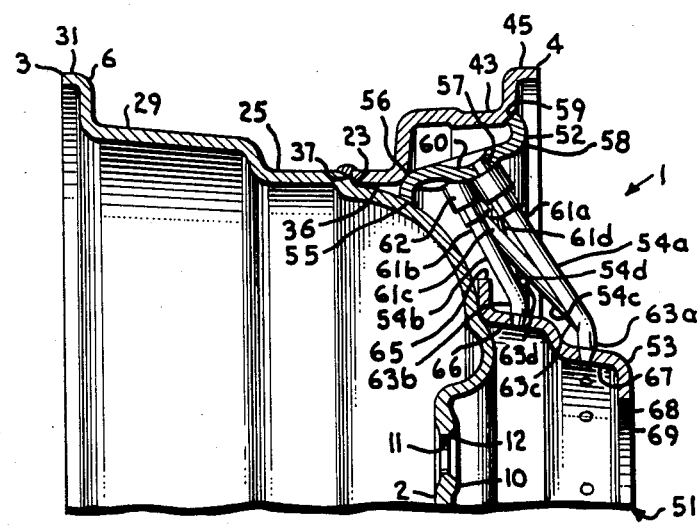
FIG. 2 is a fragmentary cross section of a wheel embodying the present invention with a spoke assembly.

The wheel 1 as shown in FIG. 2 includes a non-suspension spoke assembly 51. The spoke assembly 51 generally includes a coaxial spoke felly 52, a coaxial hub section 53 and a plurality of spokes 54 *a,b,c,d* interconnecting the felly 52 and the hub section 53.

The spoke felly 52 includes an inner edge 55 and extends radially outwardly therefrom to a rear bend 56 from which the felly 52 curves forwardly to a coaxial, frustoconical felly wall 57 which opens forwardly. Connected to the forward end of the felly wall 57 is a front bend 58 from which the felly 52 curves radially outwardly and axially rearwardly to a front edge 59. A plurality of inwardly-convex dimples 60 extend from the felly wall 57 in a radially spaced and axially staggered pattern.

The felly 52 is attached (e.g. by rosette welding or adhesive) to the wheel 1 at three locations: (1) between the transition portion 17 and the felly inner edge 55; (2) between the front rim 4 adjacent its rear edge 37 and the felly rear bend 56; and (3) between the front rim half front flange 45 and the spoke felly front edge 59.

The spokes 54 *a,b,c,d* are attached to the dimples 60 on the felly wall 57 in an axially staggered and radially spaced relationship by outer spoke connectors 62 at spoke outer ends 61 *a,b,c,d*. The spokes 54 *a,b,c,d* extend radially inwardly and axially forwardly to spoke inner ends 63 *a,b,c,d* which are attached to the hub section 53.

The hub section 53 includes a rear outer edge 65, a frusto-conical rear wall 66, a frusto-conical front wall 67 and a front edge 68 forming a coaxial hub opening 69. The spokes 54 *a,b,c,d* are attached in alternating, staggered layers at their inner ends 63 *a,b,c,d* to the hub section rear and front walls 66, 67 in radially spaced relation. The outer hub section 53 is attached adjacent to its rear outer edge 65 to the center section 2 adjacent to and radially outwardly from its first ridge 16. The lug bolt openings 11 are accessible through the hub opening 69.

Figure 3:
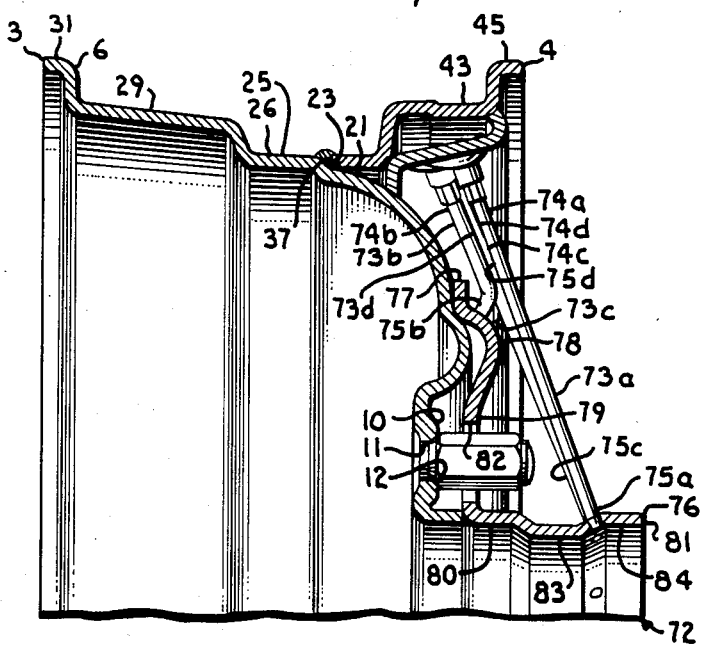
FIG. 3 is a fragmentary cross section of a wheel comprising a first alternative embodiment of the present invention with a modified spoke assembly.
Figure 4:
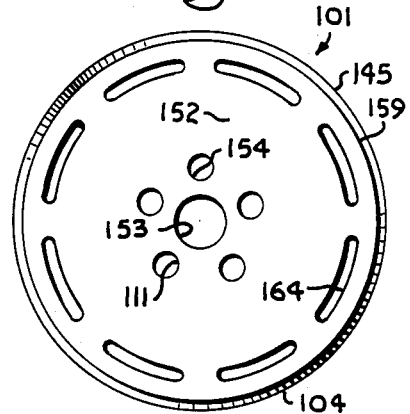
FIG. 4 is a front elevation of a wheel comprising a second alternative embodiment of the present invention with a facia.
Figure 5:
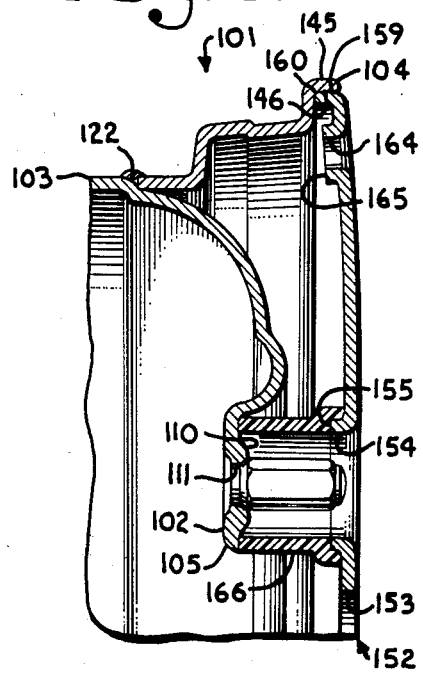
FIG. 5 is a fragmentary cross section of the wheel comprising the second alternative embodiment of the present invention taken generally along line 5—5 in FIG. 4.

The reference numeral 71 generally designates a wheel comprising a first alternative embodiment of the present invention shown in FIG. 3 with a non-suspension spoke assembly 72. The spoke assembly 72 includes a coaxial spoke felly 52 substantially identical to that described in connection with the wheel 1. A plurality of spokes 73 *a,b, c,d* are connected at respective outer ends 74 *a,b,c,d*, to the spoke felly 52 by spoke connectors 62 in axially staggered and radially spaced relation. The spokes 73 *a,b, c,d* terminate at respective inner ends 75 *a,b,c,d*.

A coaxial hub section 76 includes a coaxial outer edge 77, a forwardly-convex coaxial hub section ridge 78 positioned radially inwardly from the outer edge 77 and a coaxial lug bolt ring 79 positioned inwardly from the ridge 78. A plurality of radially spaced hub section lug bolt openings 82 extend through the lug bolt ring 79 in axially aligned relationship with the center section lug bolt openings 11. A cylindrical, coaxial inner wall 80 with a recessed intermediate portion 83 extends forwardly from the lug bolt ring 79 and terminates at a hub section front edge 81.

Spoke inner ends 75*a,b* are connected to the hub section 76 between its outer edge 77 and its ridge 78. The remaining spoke inner ends 75*c, d* are connected to the hub section inner wall 80. A coaxial hub section opening 84 is defined by the hub section inner wall 80.

The hub section 76 is attached (e.g. by rosette welding or adhesive) to the wheel center section 2 in two places: (1) between the center section 2 adjacent to its ridge 16 and the hub section 76 adjacent to its outer edge 77; and (2) between the center section front edge 6 and the hub section 76 between its lug bolt ring 79 and its inner wall 80.

The center section 2 may be painted black between the spoke fellies 52 and the hub sections 53, 76 of the wheels 1 and 71 to provide a high contrast visual backdrop for the respective spokes 54*a,b,c,d* and 73*a,b,c,d*. With the center section transition portions 17 painted black the wheels 1 and 71 are similar in appearance to suspension-type wire wheels.

FIGS. 4 through 7 show wheels 101, 181 and 191 comprising second, third and fourth alternative embodiments of the present invention with wheel covers or facias 152, 182 and 192 respectively. The wheel 101 comprising the second alternative embodiment (FIGS. 4 and 5) of the present invention includes a center section 102 integrally formed with a rear rim half 103. The center section 102 and the rear rim half 103 are substantially similar to the center section 2 and the rear rim half 3 of the wheel 1.

A coaxial front rim half 104 is mounted on the center section 102 and the rear rim half 103 at an intersection 122 therebetween. The front rim half 104 is substantially identical to the front rim half 4 of the wheel 1, except that the former includes a coaxial front flange 145 which extends further to the front and forms an annular, inwardly-open facia recess 146.

The circular facia 152 is slightly convex in a forward direction. The facia 152 includes a coaxial facia center opening 153 positioned in front of a hub opening 105 of the center section 102. A plurality (for example four, five or six) of facia bolt openings 154 are formed in the facia 152 in a concentric pattern at radially spaced intervals around the center opening 153. Each facia bolt opening 154 is defined by a respective rearwardly-extending flange 155. The facia bolt openings 154 correspond to and are coaxial with respective lug bolt openings 111 in lug embossments 110 stamped in the center section 102.

The facia plate 152 terminates at an outer circumference with a rearwardly extending rim 160 which is captured within the annular facia recess 146 by the front flange 145. A plurality (for example, twelve) of decorative slots 164 extend through the facia 152 at a position radially inwardly from the facia rim 160. The slots 164 are arcuate-shaped and arranged in a pattern concentric with the facia 152 at radially spaced intervals. Each slot 164 includes a respective facia slot flange 165 extending rearwardly from the facia 152.

A plurality of cylindrical spacers 166 are positioned between the center section 102 and the facia 152 coaxial with respective bolt openings 111 and 154. Each spacer 166 includes a rear end 167 engaging the center section 102 around a respective lug bolt opening 111 and a front end 168 engaging a respective facia bolt opening flange 155.

Figure 6:
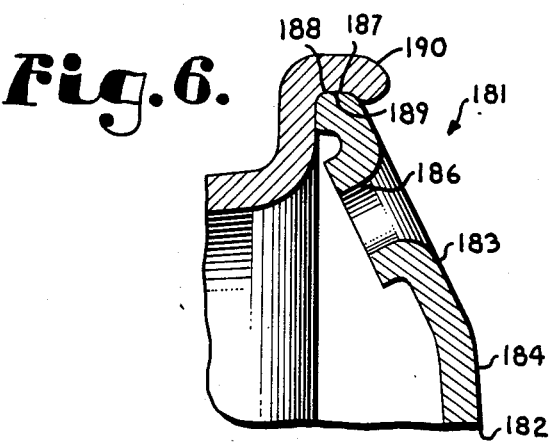
FIG. 6 is a fragmentary cross section of a wheel comprising a third alternative embodiment of the present invention with a modified facia.
Figure 7:
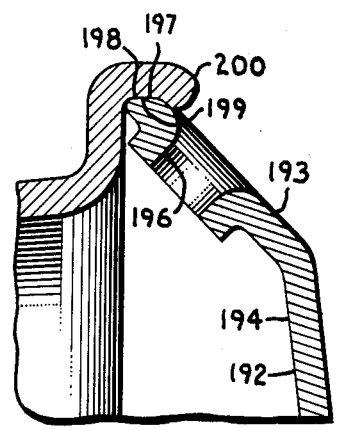
FIG. 7 is a fragmentary cross section of a wheel comprising a fourth alternative embodiment of the present invention with a further modified facia.

Referring in more detail to FIG. 6, the wheel 181 comprises a third alternative embodiment of the present invention with a modified wheel cover or facia 182. The facia 182 includes a peripheral portion 183 which is canted rearwardly from an inner portion 184. The peripheral portion 183 includes a plurality of arcuate slots 186 positioned in a circular, radially spaced pattern. The slots 186 are substantially similar to the slots 164 of the second alternative embodiment. The peripheral portion 183 terminates at an outer edge 187 with a rim 188 captured in an annular recess 189 formed by a front rim half front flange 190. The configuration of the facia 182 with its canted peripheral portion 183 provides a deeper overall configuration for the wheel 181 comprising the third embodiment than the second alternative embodiment wheel 101.

The wheel 191 comprising the fourth alternative embodiment of the present invention (FIG. 7) includes a wheel cover or facia 192 having a peripheral portion 193 which is canted even more sharply rearwardly than the corresponding peripheral portion 183 of the fourth embodiment. The peripheral portion 193 is canted rearwardly from an inner portion 184 of the facia 192 and includes a plurality of arcuate, radially spaced slots 196 in a circular pattern. The peripheral portion 193 terminates at an outer edge 187 with a rim 198 which is received in an annular recess 189 of a front rim half front flange 190. The facia 192 provides the wheel 191 comprising the fourth embodiment with an even deeper appearance yet than the wheel 181 comprising the third embodiment.

A method of forming the wheels 1, 71, 101, 181, and 191 is provided. The steps of performing the method are shown in FIGS. 8 through 14. To begin with, a disc blank 301 is cut from a square, flat plate of aluminum alloy stock 302 (FIG. 8). A center opening 303 is punched in the disc 301 and corresponds to the hub openings 5, 105. The disc 301 is centered on a first mandrel 304 of a primary punch press 305 wherein it is drawn into a primary drawn blank 306 (FIG. 9).

In a second punch press operation the drawn blank 306 is placed over a second mandrel 309 and formed in a second punch press 310 to a formed blank 308 comprising a more final configuration as shown in FIG. 10. In the forming operation the rear flange 31 or 131 is completed and the lug embossments 10 and 110 are formed.

In a third punch press operation the hub openings 5, 205 and the lug bolt openings 11, 211 are stamped in a final formed blank 311 (FIG. 11). Also, in the third operation a factory identification may be stamped in the final formed blank 311. The three-step draw, form and stamp operation described thus far completes the integrally formed center sections 2, 102 and the rear rim halves 3, 103.

A second final formed blank 312 is drawn, formed and stamped from a second disc (not shown) according to the above methods and provides a front rim half 4, 104 and other parts of the wheels as will be described hereinafter. The second final formed blank 312 is separated at a first cut line 315 into a front rim half 4, 104, and a remaining scrap portion 316 which may be referred to as a "drop" (FIG. 13). The drop 316 is employed to form additional parts of a wheel 1, 71, 101, 181 or 191 as desired.

Figure 14:
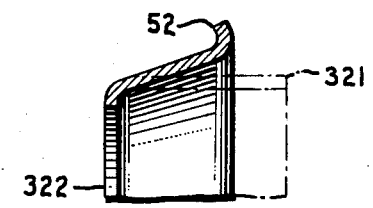
FIG. 14 is a fragmentary cross section showing the original drop configuration in phantom and a portion of the drop forming a felly in solid lines.

In the formation of wheels 1 and 71, the drop is separated at a second cut line 317 into a spoke felly blank 321 and a hub section blank 322 (FIG. 14). The spoke felly and hub section blanks 321, 322 are drawn, formed and stamped as required on punch press equipment to form completed spoke fellies 52 and hub sections 53, 76.

In the formation of the wheels 101, 181 and 191 the facias 152, 182 and 192 are produced in their desired configurations from the drop 316.

The method of producing the wheels 1, 71, 101, 181 and 191 is relatively fast because the parts are drawn, formed and stamped on punch presses. In fact, punch presses capable of performing the draw, form and stamp procedures are available which operate in cycles of approximately 20 seconds for each operation. Thus, labor and energy costs are minimized. Such punch pressing equipment is also not nearly as expensive as the equipment necessary for spinning and casting vehicle wheels. Finally, the disclosed production method is relatively efficient in its use of material since the drop 316 from the second final formed blank 312 is utilized to form additional parts and the resulting amount of scrap material is thus kept to an absolute minimum. In summary, the manufacturing method according to the present invention is particularly advantageous because of its aforementioned efficiencies in the areas of energy consumption, labor, capital investment and material.

The material (preferably aluminum alloy) for the wheels 1, 71, 101, 181 and 191 tends to work harden during the punch press operations and therefore generally does not require heat treating, which further saves energy and labor costs.

The plate 302 is formed of aluminum sheet material 0.220 inches thick and in the manufacturing process is tapered to desired configurations as required for different parts of the wheel. For example, at the center sections 2, 102 the thickness may be 0.220 inches and at the rear rim halves 3, 103 the thickness may taper to 0.180 or 0.190 inches. At the rear flange 31, 131 the material is again full thickness of 0.220 inches.

It is to be understood that while certain forms of the present invention have been illustrated and described herein, it is not to be limited to the specific forms or arrangement of parts described and shown.

What is claimed and desired to be secured by Letters Patent is as follows:

1. A vehicle wheel with a rotational axis, which comprises:
   (a) a center section including:
      (1) a coaxial hub opening;
      (2) a plurality of lug bolt openings positioned in a circular, radially spaced pattern around said hub opening;
      (3) a forwardly-convex, coaxial transition portion; and
      (4) a coaxial center section mating portion extending rearwardly from said transition portion;
   (b) a rear rim half integrally formed with said center section and including:
      (1) an annular, coaxial stop adjacent to and extending outwardly from said center section mating portion;
      (2) a coaxial, annular, rear recessed area positioned rearwardly from said stop;
      (3) a coaxial rear rim bed positioned outwardly and rearwardly from said rear recessed area; and
      (4) a coaxial rear flange extending radially outwardly from said rear rim bed;
   (c) a coaxial front rim half including:
      (1) a coaxial front rim half mating portion having an inside diameter corresponding to an outside diameter of said center section mating portion and terminating at a coaxial front rim half rear edge engaging said stop, said front rim half mating portion forming an annular front recessed area;

(2) a coaxial front rim bed positioned outwardly and forwardly from said front mating portion; and (3) a coaxial front flange extending radially outwardly from said front rim bed;

(d) connector means fixedly connecting said mating portions in a structural engagement; and (e) a non-suspension wire spoke assembly including:
(1) a coaxial, annular spoke felly having an inner edge attached to said center section, a front edge attached to said front rim half and a felly wall extending between said felly edges;
(2) a hub section attached to said center section and including an annular, outwardly-facing wall and a hub section opening; and
(3) a plurality of spokes extending radially between said felly and said hub section walls.

2. The wheel according to claim 1 wherein:
(a) said hub section includes front and rear walls, said rear wall being positioned radially outwardly from said front wall; and
(b) a plurality of said spokes are attached to each said hub section wall.

3. The wheel according to claim 1 wherein:
(a) said felly wall includes a plurality of dimples protruding radially inwardly therefrom; and
(b) each said spoke includes an outer end connected to a respective dimple.

4. The wheel according to claim 1 wherein:
(a) said felly includes a rear bend terminating at said inner edge and connected to said front rim half adjacent to said front rim half mating portion.

5. The vehicle according to claim 1 wherein:
(a) said hub section is attached to said wheel center section in spaced relation outwardly from said lug bolt pattern.

6. The vehicle wheel according to claim 5 wherein:
(a) said hub section opening is positioned in front of said lug bolt openings and said lug bolt openings are accessible through said hub section opening.

7. The vehicle wheel according to claim 1 wherein:
(a) said hub section comprises an annular, inner wall, a lub bolt ring extending radially outwardly from said inner wall with a plurality of lug bolt openings and an annular ridge positioned outwardly from said lug bolt openings;
(b) said hub section lug bolt openings align with said center section lug bolt openings;
(c) a plurality of said spokes extend between and are connected to said felly wall and said annular ridge; and
(d) a plurality of said spokes extend between and are connected to said hub section inner wall and said felly wall.

8. The wheel according to claim 1 wherein:
(a) a part of said transition portion behind said spoke assembly has a relatively dark coating applied thereto.

9. A vehicle wheel with a rotational axis, which comprises:
(a) a center section including:
(1) a coaxial hub opening;
(2) a plurality of lug bolt openings positioned in a circular, radially spaced pattern around said hub opening;
(3) a forwardly-convex coaxial transition portion; and (4) a coaxial center section mating portion extending rearwardly from said transition portion;
(b) a rear rim half integrally formed with said center section and including:
(1) an annular, coaxial stop adjacent to and extending outwardly from said center section mating portion,
(2) a coaxial, annular, rear recessed area positioned rearwardly from said stop;
(3) a coaxial rear rim bed positioned outwardly and rearwardly from said rear recessed area; and
(4) a coaxial rear flange extending radially outwardly from said rear rim bed;
(c) a coaxial front rim half including:
(1) a coaxial front rim half mating portion having an inside diameter corresponding to an outside diameter of said center section mating portion and terminating at a coaxial front rim half rear edge abutting said stop, said front rim half mating portion forming an annular front recessed area;
(2) a coaxial front rim bed positioned outwardly and forwardly from said front mating portion; and
(3) a coaxial front flange extending radially outwardly from said front rim bed;
(d) connector means adapted for fixedly connecting said mating portions in a structural engagement; and
(e) a coaxial facia having:
(1) a forwardly-convex configuration;
(2) an outer edge engaging said front rim half flange; and
(3) a plurality of facia lug bolt openings positioned in a circular, radially spaced pattern in alignment with said center section lug bolt openings; and
(f) a plurality of cylindrical facia spacers each having a rear end engaging said center section around a respective center section lug bolt opening and a front end engaging said facia around a respective facia lug bolt opening.

10. The wheel according to claim 9 wherein said facia includes:
(a) a plurality of arcuate slots extending through said facia and arranged in a circular, coaxial pattern in proximity to said facia outer edge.

11. The vehicle wheel according to claim 9, which includes:
(a) said front rim half flange having an inwardly-open, annular recess receiving said facia outer edge.

12. The vehicle wheel according to claim 9 wherein:
(a) each said facia spacer has a bore with an inside diameter sufficient to accommodate a respective lug nut.

13. The wheel according to claim 9, which includes:
(a) said front flange forming an inwardly open facia recess; and
(b) said facia including a circumferential outer edge received in said facia recess.

14. The wheel according to claim 9 wherein said facia includes:
(a) a coaxial center portion; and
(b) a coaxial, annular peripheral portion extending radially outwardly from said inner portion, said peripheral portion being canted rearwardly from said inner portion.

15. A vehicle wheel with a rotational axis, which comprises:
(a) a center section including:
(1) a coaxial hub opening;
(2) a plurality of lug bolt openings positioned in a circular, radially-spaced pattern around said hub opening;
(3) a forwardly-convex, coaxial transition portion; and
(4) a coaxial center section mating portion extending rearwardly from said transition portion;
(b) a rear rim half integrally formed with said center section and including:
(1) an annular, coaxial stop adjacent to and extending outwardly from said center section mating portion;
(2) a coaxial, annular, rear recessed area positioned rearwardly from said stop;
(3) a coaxial rear rim bed positioned outwardly and rearwardly from said rear recessed area; and
(4) a coaxial rear flange extending radially outwardly from said rear rim bed;
(c) a coaxial front rim half including:
(1) a coaxial front rim half mating portion having an inside diameter corresponding to an outside diameter of said center section mating portion and terminating at a coaxial front rim half rear edge engaging said stop, said front rim half mating portion forming an annular front recessed area;
(2) a coaxial front rim bed positioned outwardly and forwardly from said front mating portion; and
(3) a coaxial front flange extending radially outwardly from said front rim;
(d) said mating portions being structurally welded together; and
(e) a non-suspension wire spoke assembly including:
(1) a coaxial, annular spoke felly having an inner edge attached to said center section, a rear bend connected to said front rim half adjacent to said front rim half mating portion, a front edge attached to said front rim half, a felly wall extending between said felly rear bend and front edge and a plurality of dimples protruding radially inwardly from said felly wall;
(2) a hub section having front and rear walls, said hub section rear wall being positioned radially outwardly from said front wall, said hub section being attached to said center section in spaced relation outwardly from said lug bolt pattern;
(3) said hub section having an opening in front of said lug bolt openings with said lug bolt openings accessible therethrough;
(4) a plurality of spokes each extending between a respective dimple and said hub section rear wall; and
(5) a plurality of spokes each extending between a respective dimple and said hub section front wall.

* * * * *